E. H. MANNING.
WINDMILL CONSTRUCTION.
APPLICATION FILED MAR. 22, 1916.

1,219,339.

Patented Mar. 13, 1917.
4 SHEETS—SHEET 2.

Witnesses
E. Q. Rupport
John J. McCarty

Inventor
E. H. Manning
By Victor J. Evans
Attorney

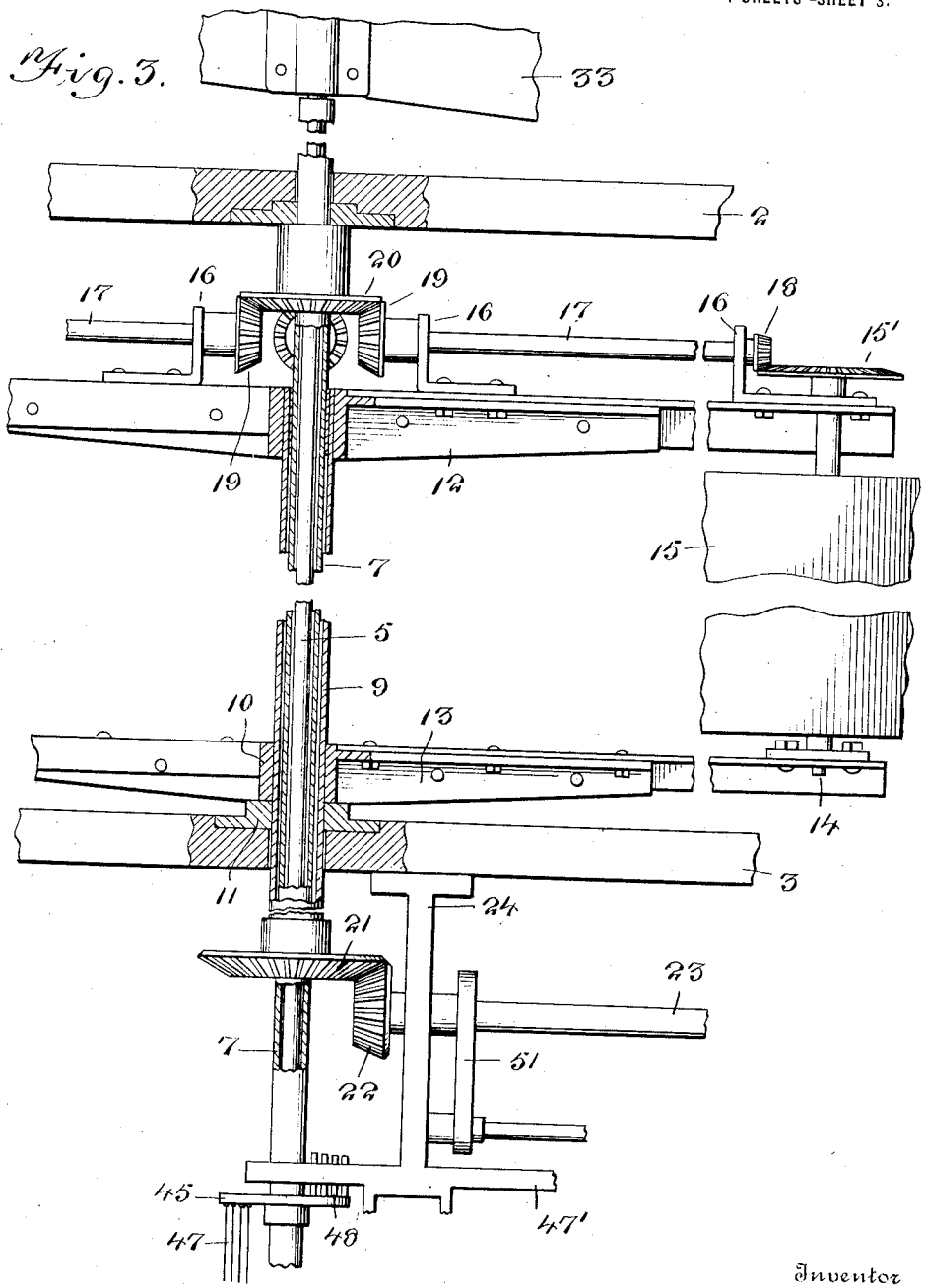

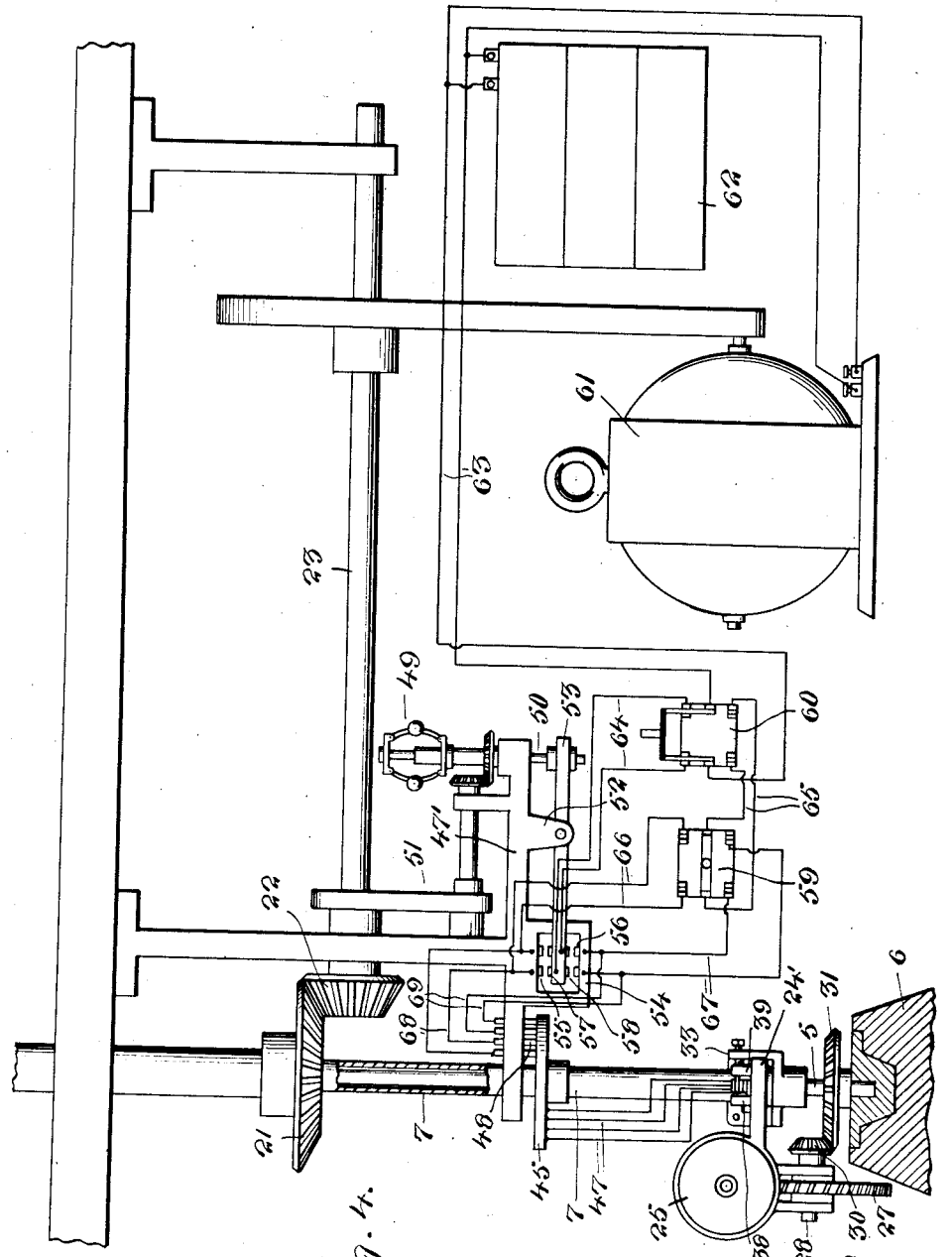

UNITED STATES PATENT OFFICE.

EBENEZER H. MANNING, OF TOMAH, WISCONSIN.

WINDMILL CONSTRUCTION.

1,219,339. Specification of Letters Patent. Patented Mar. 13, 1917.

Application filed March 22, 1916. Serial No. 85,949.

*To all whom it may concern:*

Be it known that I, EBENEZER H. MANNING, a citizen of the United States, residing at Tomah, in the county of Monroe and State of Wisconsin, have invented new and useful Improvements in Windmill Construction, of which the following is a specification.

This invention relates to improvements in wind mills and has particular application to a wind mill of the vertical wheel type.

In carrying out the present invention, it is my purpose to provide a wind mill wherein the wind wheel will embody a plurality of wind vanes spaced apart equal distances and arranged in a circle and movable simultaneously as a unit under the action of the wind and each pivoted upon a vertical axis so that the relative positions of the wind vanes may be changed to vary the surfaces presented to the wind whereby the speed of the wheel may be increased and decreased, according to the positions of the vanes, the wheel being mounted upon a shaft adapted to be rotated from the wheel under the action of the wind.

It is also my purpose to provide a wind mill of the class described wherein the positions of the wind vanes will be automatically changed as the direction of the wind varies so that the vanes will present substantially the same surfaces to the wind at all times irrespective of the direction of the wind.

Another object of my invention is to provide a wind mill embodying a wind wheel of the class described wherein the relative positions of the individual vanes may be changed to present corresponding surfaces to the wind so that the wheel will be revolved under the action of the wind, and to present opposing surfaces to the wind so that the wheel will be held stationary by the wind acting upon such opposing surfaces.

A further object of my invention is the provision of a wind mill wherein the relative positions of the wind vanes of the wheel may be changed both automatically and manually so as to vary the speed of the wheel under the action of the wind, and wherein the speed of the wheel may be automatically maintained irrespective of the change in the velocity of the wind.

With the above and other objects in view, the invention consists in the construction, combination and arrangement of parts hereinafter set forth in and falling within the scope of the claims.

In the accompanying drawings:

Fig. 3 is an enlarged fragmentary view through the wind mill.

Fig. 4 is a diagrammatic view, showing the various circuit connections.

Fig. 6 is a plan view of a detail of the invention.

Fig. 7 is a similar view of another detail.

Figure 1:
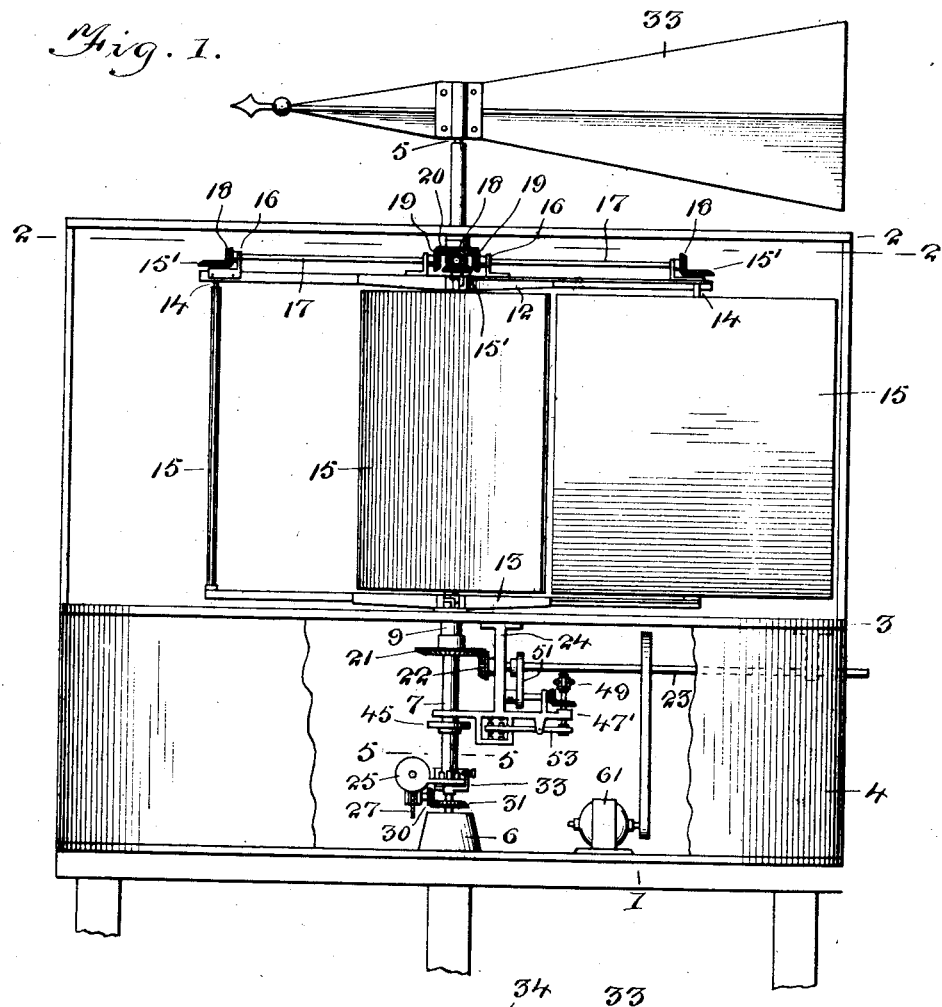
Figure 1 is a view in side elevation of a windmill constructed in accordance with the present invention.
Figure 2:
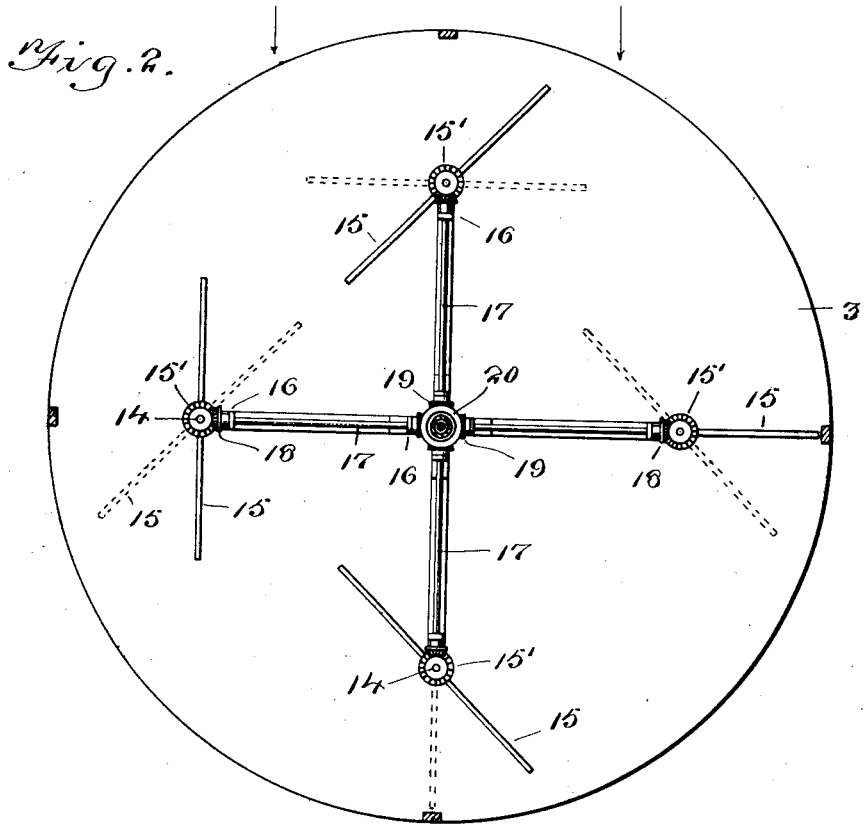
Fig. 2 is a horizontal sectional view on the line 2—2 of Fig. 1.

Referring now to the drawings in detail, 1 designates the supporting structure of the wind mill, such structure embodying an upper deck 2, a lower deck 3 and a housing 4 formed at the base of the structure 1 and having the upper end thereof closed by the deck 3. Journaled in vertically alining bearings formed in the decks 2 and 3 is a shaft 5 having the lower end thereof rotatably mounted in a step bearing 6 suitably supported within the housing 4 below the deck 3. Surrounding the shaft 5 is a tubular shaft 7 extending from a point adjacent to the upper end of the shaft 5 to a point in proximity to the lower end of such shaft 5. Encircling the tubular shaft 7 concentrically thereof is a hollow drive shaft 9 having the upper end thereof arranged a suitable distance below the upper deck 2 and the lower end terminating below the deck 3 and disposed within the housing 4 and that portion of the shaft 9 immediately above the lower deck 3 is equipped with a collar 10 bearing upon a wear plate 11 suitably secured to the upper surface of the lower deck 3 and disposed concentrically of the shafts. The shafts 5, 7 and 9 are suitably spaced apart from each other so that any one of the shafts may rotate independently of the others.

Surrounding the shaft 9 adjacent to the upper end thereof and suitably secured thereto is a four armed spider 12, while surrounding the collar 10 and fixed thereto is a four armed spider 13 having the arms thereof alining with the respective arms of the spider 12. Journaled in the outer ends of the alining arms of the spiders 12 and 13 are vertical shafts 14 and fixed upon each shaft 14 is a wind vane 15. The vane 15 is secured between its ends to the shaft 14. Fixed upon the upper ends of the shafts 14 are bevel gears 15′ respectively, while secured to the upper edges of the arms of the spider 12 are pairs of bearings 16 respectively and journaled in each pair of bearings 16 is a shaft 17 lying parallel with the arms of the spider. These shafts 17 radiate from the axis of the shafts 5, 7 and 9 and secured to the outer end of each shaft 17 is a bevel pinion 18 meshing with the adjacent bevel gear 15′, while fixed to the inner ends of the shafts 17 are bevel pinions 19 meshing with a bevel gear 20 surrounding the shaft 7 and secured thereto. Fixed upon the lower end of the hollow shaft 9 is a bevel gear 21 meshing with a similar pinion 22 secured to a power shaft 23 journaled in hangers 24 depending from the lower deck 3. This shaft 23 is arranged within the housing 4 and one end thereof projects through the housing and may be connected with the element to be driven in any suitable manner. Secured to the lower end of the shaft 7 is one end of a right angular bracket arm 24′ and secured upon the bracket arm 24′ at the other end thereof is an electric motor 25. Fixed upon one end of the armature shaft of the motor 25 is a worm 26 meshing with a worm wheel 27 keyed upon a stub shaft 28 journaled in a bearing carried by the motor casing. Also fixed upon the stub shaft 29 is a bevel pinion 30 meshing with a bevel gear 31 fastened to the lower end of the shaft 5. Secured to the upper end of the shaft 5 is a tail vane 33 of any suitable construction.

Fastened to the shaft 5 immediately below the lower end of the tubular shaft 7 is a bracket 32 and secured to the bracket 32 is a substantially right angular bar 33 having the limbs thereof designed to engage one side edge or the other of the leg of the bracket arm 24′ secured to the shaft 7, according to the position of such bracket arm 24′. Threaded through the outer ends of the bar 33 are set screws 34 and 35 respectively. Secured to the leg of the bracket arm 24′ fastened to the shaft 7 and disposed at the edge of such leg adjacent to the set screw 34 are contact studs 36 insulated from the bracket arm, while secured to the said leg of the bracket arm at the other edge thereof are contact studs 37 insulated from the bracket arm. Pivoted upon said leg of the bracket arm 24′ at the juncture of the legs of such bracket arm are arms 38 and 39 normally disposed in parallelism and having the outer edges thereof held in engagement with the studs 36 and 37 respectively by means of a spring 40 fastened to the bracket arm 24′ and bearing against the inner edges of the arms 38 and 39. Embedded in the outer edge of the arm 38 are contact studs 41 adapted to engage the studs 36 respectively, while embedded in the outer edge of the arm 39 are contact studs 42 adapted to engage the studs 37 respectively. The studs 41 and 42 are connected across the terminals of the motor 25, while the studs 36 are connected with binding posts 43 secured to the bracket arm 24′. The studs 37 are connected to binding posts 44 secured to the bracket arm 24′. Fixed to the hollow shaft 7 at a suitable distance above the motor 25 and disposed concentrically of such shaft is a disk 45 and secured to the upper face of the disk 45 concentrically of the disk and of one another are collector rings 46 connected by way of wires 47 with the respective binding posts 43 and 44. The hanger 24 adjacent to the concentrically disposed shafts 5 and 7 is relatively long and secured to the lower end thereof is a cross arm 47′ having one extremity overlapping the disk 45 and secured to such extremity of the cross arm 47′ and depending therefrom are brushes 48 engaging the respective collector rings 46. Mounted upon the other end of the cross arm 47′ is a governor mechanism 49 which, in the present instance, is of the centrifugal type and this governor mechanism controls a vertical shaft 50 journaled in the cross arm 47′. The governor is driven by suitable means 51 connected to the drive shaft 23. Depending from the cross arm 47′ between the shaft 50 and the hanger is a bracket 52 and pivoted in the bracket 52 is a horizontal lever 53 having one end connected with the lower extremity of the vertical shaft 50 and the other end projecting into a casing 54. Secured to the top wall of the casing 54 and projecting into the latter are contact studs 55, while secured to the bottom wall of such casing and projecting into the same are contact studs 56. Secured to the upper edge of the lever 53 are contact studs 57 adapted to engage the studs 55, while secured to the lower edge of the lever are contact studs 58 designed to engage the contact studs 56. 59 and 60 designate respectively manually operable double pole double throw switches. Suitably connected to the drive shaft 23 and adapted to be driven therefrom is a dynamo 61 having the terminals thereof connected with a storage battery 62, designed to be charged by the generator 61. Leading from the poles of the storage battery 62 are conductors 63 terminally connected to the pivot points of the switch 60, while leading from one pair of contact jaws of the switch 60 are conductors 64 terminally connected to the studs 57 and 58. The remaining contact jaws of the switch 60 are connected by means of conductors 65 with the pivot points of the switch 59, while one pair of contact jaws of the switch 59 are connected to the studs 55 by means of conductors 66 and the other pair of jaws of the switch 59 connected to the studs 56 by means of conductors 67. The conductors 66 are connected to two of the brushes 48 by means of branch wires 68, while the conductors 67 are connected to the remaining brushes 48 by means of branch wires 69.

In the operation of the wind mill, the wind impinges upon the vanes or blades 15 with the effect to rotate the wheel as a unit and in the rotation of the wheel motion is transmitted from the shaft 9 through the bevel gear 21 and the pinion 23 whereby the machinery connected with the shaft 23 may be driven. In the rotation of the wheel about the axis of the shaft 9, the shaft 7 remains stationary and as the bevel gear 20 is fixed to the shaft 7 and the pinions 19 are in mesh with the gear 20, the shafts 17 are revolved and transmit a rotary motion to the shafts 14, thereby revolving the vanes or blades 15 so that such blades will be disposed at an angle to the wind when moving with the wind and be brought into the wind edgewise successively so that the maximum power may be delivered to the wheel from the wind. In the event of the wind changing, the tail vane 33 will follow the same and rotate the shaft 5, and as the pinion 30 is in mesh with the bevel gear 31 and the worm wheel 27 in mesh with the worm 26, the pinion, worm wheel and worm will be held stationary and motion transmitted through such pinion, worm wheel and worm and the motor casing to the shaft 7. In the rotation of the shaft 7, motion is transmitted to the gear 20 and pinions 19 to the shafts 17, thereby revolving the vanes or blades to change the relative positions of such blades so that the blades will present the same surfaces to the wind as before the wind changed.

Figure 5:
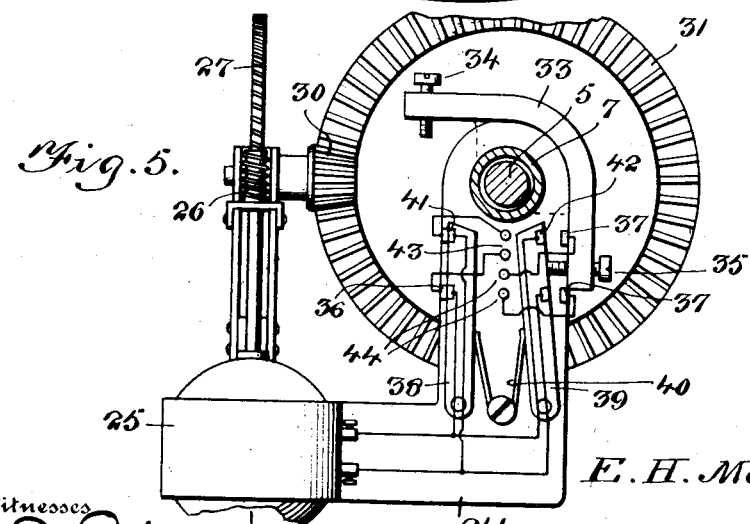
Fig. 5 is an enlarged horizontal sectional view on the line 5—5 of Fig. 1.

When starting the mill, the lever 53 is held in such position by the governor 49 as to engage the studs 58 with the studs 56 and the switch 60 is closed manually, thereby directing current from the storage battery through the switch 64, the contacts 58 and 56, the conductors 69, the brushes and rings corresponding to such conductors 69 and the conductors 47 corresponding to the conductors 69, the studs 42, 37 and the motor, thereby energizing the motor. Upon the energization of the motor, the worm wheel 27 in mesh with the worm 26 rotates the pinion 30 and as the bevel gear 31 meshing with the pinion 30 is held stationary by the wind acting on the tail vane, the bracket arm 24' is turned in a counter-clockwise direction in Fig. 5, thereby rotating the shaft 7 to swing the vanes 15 into the wind. As soon as the vanes 15 are full in the wind, the arm 39 on the moving bracket arm 24' contacts with the screw 35, thereby breaking the circuit of the motor. In the event of the wind increasing in velocity, the governor 49 driven by the shaft 23 moves the shaft 50 downwardly, thereby swinging the lever 53 to disengage the studs 58 from the studs 56 and engage the studs 57 with the studs 55, thereby connecting the motor to the storage battery 62 by way of the conductors 63, switch 60, conductors 64, the studs 57 and 55, conductors 68, the collector rings and conductors 47 corresponding to the conductors 68 and the studs 36 and 41. This energizes the motor in the reverse direction and in the operation of the motor, the bracket arm 24' is carried around in a clockwise direction in Fig. 5, incident to the bevel gear 31 remaining stationary and the pinion 30 rotating from such bevel gear through the medium of the worm 26 and worm wheel 27. In this movement of the bracket arm 24', the shaft 7 is revolved to swing the vanes 15 about their respective axes to present less surface to the wind and as soon as the speed of the wheel has dropped sufficiently to check the speed of the governor 49, the latter moves the shaft 50 to restore the lever 53 to normal position, thereby breaking the circuit of the motor at this point. Should it be desired to stop the windmill at any time, it is only necessary to throw the switches 59 and 60 to a position to connect the motor in circuit with the battery through the engaging studs 36 and 41 whereby the current will flow through the circuit last described, thereby energizing the motor to throw the vanes out of the wind. When the vanes have been thrown out of the wind, the arm 38 engages the screw 34, thereby breaking the motor circuit at the studs 36 and 41.

While I have herein shown and described the preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In wind mill construction, a power shaft, a wind wheel secured to said shaft and disposed concentrically thereof and embodying a plurality of wind vanes spaced apart equal distances around said shaft and each pivoted centrally upon a vertical axis and adapted to receive the impact of the wind to revolve the wheel, a second shaft within the first-named shaft, connections between the last-mentioned shaft and said vanes whereby the latter will be rotated about their axes respectively in the rotation of the wind wheel to change the surfaces of the vanes presented to the wind, means for rotating the second-named shaft to revolve said vanes upon their respective axes to change the relative positions of the blades in accordance with the direction of the wind, a shaft within the second-named shaft, a connection between one end of said last shaft and said means, and a tail vane on the other end of said shaft for rotating the last-named shaft to operate said means.

2. In wind mill construction, a wind wheel comprising a plurality of wind vanes spaced apart equal distances and arranged in a circle and adapted to be acted upon by the wind to rotate the wheel, each of said vanes being pivoted centrally upon a vertical axis, a power shaft carrying said wheel and rotatable therefrom when the vanes are subjected to the action of the wind, and electro responsive means for rotating said vanes about their respective axes to change the surfaces thereof presented to the wind.

3. In wind mill construction, a wind wheel comprising a plurality of wind vanes spaced apart equal distances and arranged in a circle and adapted to be acted upon by the wind to rotate the wheel, each of said vanes being pivoted centrally upon a vertical axis, a power shaft carrying said wheel and rotatable therefrom when the vanes are subjected to the action of the wind, electro responsive means for rotating said vanes about their respective axes to change the surfaces thereof presented to the wind, an electric circuit for said electro responsive means, and governor mechanism controlling said circuit and under the control of said wind wheel.

4. In wind mill construction, a wind wheel comprising a plurality of wind vanes spaced apart equal distances and arranged in a circle and adapted to be acted upon by the wind to rotate the wheel, each of said vanes being pivoted centrally upon a vertical axis, a power shaft carrying said wheel and rotatable therefrom when the vanes are subjected to the action of the wind, electro responsive means for rotating said vanes about their respective axes to change the surfaces thereof presented to the wind, an electric circuit for said electro responsive means, governor mechanism controlling said circuit and under the control of said wind wheel, and means for closing said circuit manually independently of said governor mechanism to throw the vanes into and out of the wind.

5. In wind mill construction, a wind wheel comprising a plurality of wind vanes spaced apart equal distances and arranged in a circle and adapted to be acted upon by the wind to rotate the wheel, each of said vanes being pivoted centrally upon a vertical axis, a power shaft carrying said wheel and rotatable therefrom when the vanes are subjected to the action of the wind, electro responsive means for rotating said vanes about their respective axes to change the surfaces thereof presented to the wind, an electric circuit for said electro responsive means, governor mechanism controlling said circuit and under the control of said wind wheel, means for closing said circuit manually independently of said governor mechanism to throw the vanes into and out of the wind, and means under the control of the wind wheel for automatically breaking said circuit after the vanes have been thrown into the wind, and out of the wind.

In testimony whereof I affix my signature in presence of two witnesses.

EBENEZER H. MANNING.

Witnesses:
 Wm. B. Naylor, Jr.,
 Vell Hebberd.